United States Patent [19]  
Greenwood

[11] Patent Number: 4,578,370
[45] Date of Patent: Mar. 25, 1986

[54] GAS CIRCULATION METHOD FOR MOVING BED CATALYST REGENERATION ZONES

[75] Inventor: Arthur R. Greenwood, Niles, Ill.

[73] Assignee: UOP Inc., Des Plaines, Ill.

[21] Appl. No.: 727,151

[22] Filed: Apr. 25, 1985

[51] Int. Cl.[4] .................. B01J 37/24; B01J 38/26; B01J 23/96; C10G 35/085

[52] U.S. Cl. ................... 502/37; 208/140; 208/165; 208/168; 422/216; 422/223; 502/47; 502/48

[58] Field of Search ......... 502/37, 47, 48, 45, 502/46, 49; 208/140, 165, 168

[56] References Cited

U.S. PATENT DOCUMENTS

| | | | |
|---|---|---|---|
| 2,303,717 | 12/1942 | Arveson | 208/165 |
| 3,238,122 | 3/1966 | Hagerbaumer | 208/165 |
| 3,652,231 | 3/1972 | Greenwood et al. | 23/288 G |
| 3,725,249 | 4/1973 | Vesely et al. | 208/139 |
| 3,978,150 | 8/1976 | McWilliams, Jr. | 260/683.3 |
| 3,981,824 | 9/1976 | Greenwood et al. | 252/415 |
| 4,094,814 | 6/1978 | Lemberger et al. | 252/415 |
| 4,094,817 | 6/1978 | Olson et al. | 252/415 |
| 4,480,144 | 10/1984 | Smith | 585/481 |

Primary Examiner—P. E. Konopka
Attorney, Agent, or Firm—Thomas K. McBride; William H. Page, II; John F. Spears, Jr.

[57] ABSTRACT

A method is disclosed for regenerating particulate catalyst used in a hydrocarbon conversion process such as catalytic reforming. The method is especially applicable to moving bed reactor systems. The catalyst being regenerated slowly moves downward as a dense bed which is contacted with different gas streams at different elevations within the regeneration zone. The invention involves employing a portion of relatively hot combustion gas as a heating gas stream, with the remainder of the combustion gas being cooled and recycled to the combustion zone. This eliminates the need to employ a heater to provide a suitable heating gas stream.

17 Claims, 1 Drawing Figure

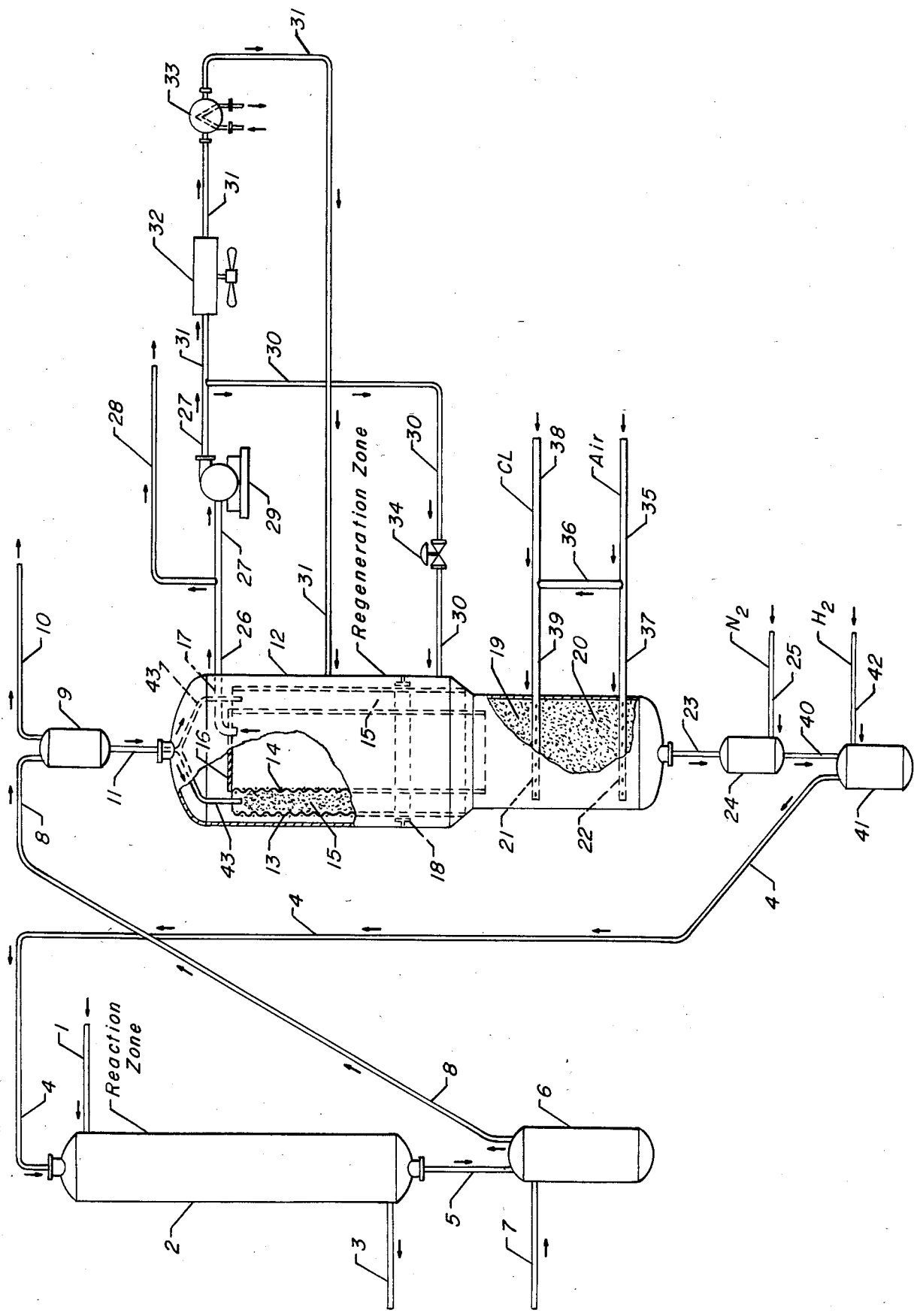

GAS CIRCULATION METHOD FOR MOVING BED CATALYST REGENERATION ZONES

FIELD OF THE INVENTION

The invention relates to the operation of moving bed reaction systems employed in such hydrocarbon conversion processes as catalytic reforming, catalytic dehydrogenation and dehydrocyclodimerization. The subject invention specifically relates to the regeneration gas flows employed during the passage of used catalyst particles downward through a moving bed regeneration zone. The invention therefore relates to the method and equipment employed to provide a suitable oxygen-containing combustion gas stream and heating gas stream which are circulated through the regeneration zone and to the provision of other gas streams which are also passed through the catalyst retained within a moving bed catalyst regeneration zone.

BACKGROUND OF THE INVENTION

Those familiar with hydrocarbon conversion processes have long recognized that it is advantageous to perform these processes in a continuous manner. This has prompted the development of the so-called moving bed catalytic processes. In a moving bed process, the catalyst descends downward through a reaction zone in a compact, non-fluidized bed due to the action of gravity. That is, as catalyst is gradually removed from the bottom of the reactor, newly regenerated catalyst fed to the top of the reactor gradually moves downward to fill in the now available void spaces thereby providing a continuous bed of catalyst which is periodically renewed. An early example of this type of catalyst flow in a reactor is provided in FIG. 3 of U.S. Pat. No. 2,303,717 issued to M. H. Arveson. This particular patent teaches the use of a moving bed reaction zone and a moving bed regeneration zone, and the use of lockhoppers and stripping zones in catalyst treatment and transportation. Another example of a moving bed hydrocarbon conversion process is presented in U.S. Pat. No. 3,238,122 issued to W. A. Hagerbaumer. U.S. Pat. No. 3,725,249 issued to K. D. Vesely et al is pertinent for its teaching of a moving bed reforming operation with associated regeneration equipment. U.S. Pat. No. 3,978,150 issued to F. G. McWilliams, Jr. is pertinent for its showing of a continuous or moving bed dehydrogenation process which employs moving bed catalyst regeneration. U.S. Pat. No. 4,480,144 issued to F. A. Smith illustrates a carbon burnoff generation procedure for use with zeolitic catalyst.

U.S. Pat. No. 3,652,231 issued to the applicant is pertinent for its showing in FIG. 1 of the internal structure of a catalyst regeneration zone and the gas flows employed within the regeneration zone. This reference illustrates the use of an oxygen-containing gas stream in a carbon burnoff zone located in an upper portion of the regeneration zone, with this oxygen-containing gas stream being circulated through external lines which include cooling and pressurization means. This reference also illustrates a lower chlorination section, a subsequent drying section, and the reduction of the metallic components of the regenerated catalyst prior to the return of the reconditioned catalyst of the reaction zone. This reference also gives generalized teaching on the operation of this regeneration procedure and the associated catalytic reforming zone.

Other arrangements for providing the necessary gas flows to moving bed regeneration zones are illustrated in U.S. Pat. Nos. 3,981,824 issued to the applicant herein; 4,094,814 issued to E. S. Lemberger et al; and 4,094,817 issued to R. K. Olson et al. It is believed that heretofore it has been standard practice to remove the combustion gas from the regeneration zone and to then cool the combustion gas prior to such steps as division of the combustion gas into various streams or pressurization of the combustion gas.

SUMMARY OF THE INVENTION

The invention is a gas circulation method fur use in the regeneration by carbon burnoff of used particulate catalsyt in a moving bed regeneration zone. The invention provides gas streams having different temperatures for use in different locations in the regeneration zone without the provision of a heating means, such as used to generate high temperature gas in prior art methods. The invention is also distinguished by the method in which the required oxygen for the carbon combustion is added to the regeneration zone, with this oxygen being provided by drying and chlorination streams charged to a lower part of the regeneration zone for countercurrent passage descending low carbon content catalyst.

A broad embodiment of the invention may be characterized as a process for regenerating particulate catalyst which comprises the steps of passing used catalyst into a regeneration zone and downward through the regeneration zone as a compact bed; contacting the used catalyst with an oxygen-containing gas stream in a combustion zone located within the regeneration zone at conditions which result in the combustion of carbon present on the used catalyst and thereby producing a combustion gas stream, which is withdrawn from the regeneration zone, and low-carbon catalyst; passing the low-carbon catalyst downward through a temperature adjustment zone located within the regeneration zone and therein contacting the low-carbon catalyst with a temperature adjusting gas stream; passing the low-carbon catalyst downward through a drying zone located within the regeneration zone and therein contacting the low carbon catalyst with a drying gas stream; compressing at least a major portion of the combustion gas stream, and thereby producing a first process gas stream; passing a first aliquot portion of the first process gas stream into the temperature adjustment zone as the previously referred to temperature adjusting gas stream; and, cooling a second aliquot portion of the first process gas stream and then passing the second aliquot portion of the first process stream into the combustion zone as the previously referred to oxygen-containing gas steam.

BRIEF DESCRIPTION OF THE DRAWING

The drawing is a schematic illustration of a moving bed catalytic reforming process in which a particulate catalyst is regenerated in the regeneration zone 12 through the use of an oxygen-containing combustion supporting gas supplied through line 31, with the catalyst subsequently being heated by a heating gas stream supplied through line 30 prior to chlorination and drying in a lower portion of the regeneration zone.

DETAILED DESCRIPTION

The hydrocarbon conversion arts have for a long time recognized benefits which may be obtained by employing a moving bed reaction zone. Among these advantages are the ability to operate at a constant set of operating conditions and to produce a relatively uniform product during the course of operations. Other advantages include an ability to operate at a higher severity than would normally be commercially practical and the avoidance of periodic shutdowns for catalyst replacement of regeneration. These advantages have prompted the development of moving bed reaction zones, catalyst handling systems, and moving bed catalyst regeneration zones. The availability of more attrition resistant catalyst together with the improvements which have been obtained in the catalyst handling and regeneration systems have resulted in the use of moving bed reaction system being commercially viable in a large number of hydrocarbon conversion processes including catalytic reforming, catalytic dehydrogenation of acyclic hydrocarbons and dehydrocyclodimerization. The latter process is useful in the conversion of light aliphatic hydrocarbons such as propane or butylene into $C_6+$ product hydrocarbons such as benzene, toluene, xylene and acyclic $C_6$ to $C_9$ hydrocarbons.

In the processes to which the subject invention applies, a reactant stream comprising a feed hydrocarbon, and often also containing hydrogen, is contacted with a particulate catalyst under conditions which are effective to promote one or more desired chemical reactions. This contacting will typically cause the deposition upon the surface of the catalyst of a hydrogen deficient hydrocarbonaceous material referred to in the art as coke. The accumulation of this high carbon content material upon the catalyst will normally have deleterious effects upon the activity and/or selectivity of the catalyst. These deleterious effects are normally caused by the carbonaceous coke obscuring active catalytic sites or being deposited upon the surface or within the pores of the catalyst and thereby blocking the transportation of various reactive species throughout the catalyst or onto the caatalyst surface. It is customary in the hydrocarbon conversion arts to either periodically replace the catalyst or if possible to regenerate the catalyst by the removal of the coke through combustion.

In the coke combustion regeneration procedure, a bed of deactivated or used catalyst is contacted with an oxygen-containing gas stream at an elevated temperature sufficient to initiate the combustion of the coke deposits. The oxygen-containing gas stream would normally have a minimal oxygen content and will be circulated in a manner to control the maximum temperature achieved within the bed of catalyst undergoing regeneration. This temperature control is desirable to prevent deactivation of the catalyst or damage to the regeneration equipment due to the potentially excessive temperatures which can be obtained by combustion of the carbonaceous materials, especially in the presence of active catalytic metals which often serve to promote combustion. In some instances, it is desirable or necessary to perform other regeneration steps subsequent to the carbon burnoff step. For instance, it is often desirable to perform a halogenation step, drying step and/or a reduction step subsequent to the carbon burnoff. These steps are normally performed using separate gas streams which are passed through catalyst having a low carbon content. These subsequent catalyst reconditioning regeneration steps may in some instances be optimized by their prformance at conditions other than the optimum conditions for the coke burnoff regeneration step. Specifically, in some instances, it is desired to perform the chlorination or drying step at a hotter temperature or at a cooler temperature than the combustion zone is operated at. It is therefore necessary to further heat or cool the catalyst after it has been withdrawn from the zone in which the coke is being combusted.

It is an objective of the subject invention to provide a method for the regeneration of particulate catalyst in a moving bed catalyst regeneration zone. It is a particular objective of the subject invention to provide process gas streams having different temperatures for use within a moving bed catalyst regeneration zone. It is another objective of the subject invention to reduce the amount of equipment required for providing various process streams employed in a moving bed catalyst regeneration zone and for providing gas streams having different temperatures for use within the regeneration zone. It is a particular objective of the subject invention to provide a relatively hot gas stream for use in heating catalyst which is being withdrawn from the combustion zone of a catalyst regeneration zone. In the subject invention these objectives are obtained by passing the combustion gas removed from the combustion zone through a pressurization means prior to any cooling step, followed by the division of the thus pressurized stream into a portion which is cooled for recycling to the combustion zone and a relatively hot portion which is used at a lower location within the regeneration zone.

In the moving bed systems which are relevant to this invention the catalyst moves downward through a reaction zone by the reaction of gravity in the manner previously described. It is therefore necessary to periodically transport the catalyst upward to the top of the reaction or regeneration zone. The exact transfer requirements and the number of times the catalyst must be transferred will be dependent upon the layout of the individual process. For instance, if the reaction zone is mounted directly above or below the regeneration zone, it is only necessary to transport the catalyst from the bottom of this combined circuit to the top of this circuit. In comparison, the reaction zone and the regeneration zone are more normally located side-by-side that it is necessary to transport quantities of the catalyst from the bottom of the reaction zone to the top of the regeneration zone and simultaneously transport catalyst from the bottom of the regeneration zone to the top of the reaction zone. This upward transportation of the catalyst could be obtain by various auger-type conveyers, buckets, or other mechanical contrivances. However, it is greatly preferred and it is the industry standard to transport the catalyst by means of a fluidizing gas which carries the catalyst as the gas passes upward through a conduit. In this mode of operation, the catalyst falls into a lift or a lift engager and is then carried upward by a gas stream charged to the liftpot engager. This gas stream may be hydrogen, nitrogen, methane, or one of a number of other similar gases.

It is also customary to employ various lockhoppers within catalyst transfer systems. For instance, lockhoppers provide a convenient safety measure to prevent the passage of combustible gas into the regeneration zone where it may become admixed with oxygen-containing gas. In a like manner, it is normally desired to employ some type of lockhopper or seal device between the regeneration zone and the reaction zone to prevent the passage of oxygen-containing gas into the reaction zone. Lockhoppers and other catalyst-handling zones or vessels are also employed within these processes for catalyst treating such as chlorination or metals reduction, or for pressurizing or depressurizing catalyst during the transportation of the catalyst through the overall system. Hydrogen and other gases are often used as the purge, pressurization or treating gas in these various lockhoppers and catalyst treating zone. Descriptions of suitable catalyst transfer systems for use in the subject process are available in standard reference materials. For instance, U.S. Pat. Nos. 3,839,196 and 3,839,197 describe catalyst systems and control techniques. An apparatus for uniform catalyst withdrawal and transfer is disclosed in U.S. Pat. No. 3,856,662. An elutriation zone for use at the top of the regeneration zone is described in U.S. Pat. No. 3,825,116.

The operating procedures and conditions necessary for the successful regeneration of a catalyst will be of course dependent upon the specific catalyst being regenerated. It may also be dependent upon the intended use of the catalyst. The required regeneration procedure will therefore vary. For instance, during the regeneration of a platinum-containing catalyst used in a reforming process, it is normally desired to pass the catalyst through a chlorination section after the catalyst has passed through the carbon burnoff zone of the regeneration zone. In contrast, in the now-preferred hydrocyclodimerization process the gallium-containing catalyst does not have a halogen component and would not be subjected to a halogenation step during the regeneration procedures.

A general overview of regeneration procedures and operating conditions are presented in the previously cited U.S. Pat. Nos. 3,652,231; 3,981,824; 4,094,814; and 4,094,817. The teachings of these four U.S. Patents are incorporated herein by reference. It is generally preferred that the carbon burnoff section or combustion zone of the overall unitary regeneration zone is operated at a superatmospheric pressure above about 2.0 inches of water gauges. Pressures up to about 225 psig are suitable, with pressures below 50 psig being preferred. The carbon burnoff section must be operated at a temperature sufficient to initiate and maintain the combustion of the coke deposits. The carbon burnoff section would therefore normally be operated at least above 700° F. (371° C.). It is preferred that the carbon burning zone of the regeneration zone is not operated at a temperature above about 1250° F. (675° C.) as measured at the exit screen of the catalyst bed. Inlet temperatures below about 900° F. (482° ) are especially preferred. The oxygen concentration in the gas being recirculated through the carbon burnoff section of the regeneration zone is held at a reduced level compared to air as a catalyst temperature control measure. A large amount of recirculated inert gases is passed through the catalyst in admixture with the oxygen to serve as a heat sink and heat removal media. It is normally preferred that the gas passing into the carbon burnoff section of the regeneration zone will have a total oxygen content below about 2.5 mole percent. The preferred oxygen content for the gas being employed at this point in the regeneration zone is from about 0.4 to about 1.5 mole percent.

The conditions employed within the halogenation section will be dictated by the results of experimental regeneration of the catalyst to determine optimum regeneration conditions and to minimize the required amount of halogen charged to the regeneration zone. The halogenation operation will typically be a chlorination, but could also comprise the contacting of the low-carbon content catalyst with a different halogen such as fluorine, bromine, or iodine. In the preferred embodiment of the invention, which is the use of the regeneration zone to regenerate spherical alumina particles containing platinum and alumina used in a catalytic reforming zone, the halogenation step comprises contacting the low-carbon content catalyst with a stream comprising an admixture of chlorine containing substance and oxyen at a temperature which is somewhat elevated as compared to the preferred operating temperature of the carbon burnoff section. An organic chloride or HCl may be employed as the chlorine containing substance. More specifically, while it is preferred to operate the carbon burnoff section at an inlet temperature below about 900° F., such as 890° F. (476° C.), it is preferred to operate the chlorination section at a high temperature. The temperature of 960° F. (515° C.) is a representative operating inlet temperature for the chlorination zone. The required temperature increase to fulfill these desired operating conditions is provided by contacting the low-carbon content catalyst withdrawn from the carbon burnoff zone with the relatively hot diverted portion of combustion gas in the heating zone located intermediate the carbon burnoff zone and the halogenation zone.

If a drying zone is employed subsequent to the halogenation zone, it is preferred that the drying zone is operated at a temperature approximately equal to the halogenation zone. Temperatures above about 900° F. (482° C.) are, however, normally satisfactory for use in the drying zone with an adequate drying gas flow rate. The preferred unitary construction of the regeneration zone results in all of the catalyst treating sections or zones being at essentially the same operating pressure. The only pressure difference will be that inherent with the flow of various vapor streams through the catalyst beds and distances which separate different points within the regeneration zone. The total pressure difference between any two points in the regeneration zone should therefore be less than about 2 psi. The operating pressure of the chlorination, drying and heating zones are therefore set by the chosen operating pressure of the carbon burnoff section.

Referring now to the drawing, there is illustrated a reaction zone shown generally as 2. This reaction zone will normally comprise three or four individual catalyst beds with interstage heating in the case of catalytic reforming or catalytic dehydrogenation reactions. The details of these conventional interstage reactant reheating operations is not shown in the drawing for the purpose of simplicity and also since the subject process can be employed in conjunction with reaction zones in which such interstage reheating facilities are not required. The drawing has also been simplified by not showing other details not necessary for an understanding of the inventive concept. The reactant feed stream enters the reaction zone through line 1. After having contacted the catalytic particles for one or more times at reaction conditions the reactants and product compounds are removed from the reaction zone through line 3 and transferred to the appropriate product recovery facilities. The solid catalytic particles are continuously or intermittently removed from the reaction zone through circuit 5 and transferred downward into the lft engaging vessel 6. This catalyst transfer is by the action gravity, with the removal of catalyst from the bottom part of the reaction zone allowing catalyst located above to the settle downward through the reaction zone. Catalyst withdrawn from the bottom of the reaction zone is placed by freshly regenerated catalyst supplied through conduit 4. A fluidization gas such as hydrogen or nitrogen is supplied to the lift engaging vessel 6 through line 7 in a manner which effects the transfer of used catalyst upward through conduit 8. The used catalyst then enters the elutriation and disengaging vessel 9 wherein fine catalyst particles and the lift gas from line 7 are separated into a stream which is removed from the process via conduit 10. The used, high-carbon content or spent catalyst is then transferred downward from the disengaging vessel 9 through conduit 11 into the regeneration zone shown generally as 12.

The catalysts is confined as a dense compact mass within the regeneration zone, with each catalyst particle resting upon catalyst particles below it. The catalyst particles gradually move downward through the moving bed regeneration zone and pass through a number of different zones in which they are contacted with different gas streams. In the upper portion of the regeneration zone, the catalyst is fed through distribution conduits 43 into an annular catalyst bed 15 confined between an inner cylindrical porous screen 14 and an outer cylinder porous screen 13. These screens divide the upper portion of the regeneration zone into the annular catalyst retaining volume located between the screens and two reactant or gas transfer volumes. The outer gas transfer volume is located between the outer screen 13 and the inner surface of the cylindrical vertical wall of the regeneration zone. The inner gas transfer volume is a cylindrical volume located with the inner screen 14. The top of the cylindrical internal gas transfer volume is sealed by an imperforate round plate 16. The inner screen 14 preferably extends downward into a lower portion of the regeneration zone and at this point contacts a lower cylindrical bed 19 of catalyst retained within a lower portion of the regeneration zone.

In the upper portion of the regeneration zone carbon is removed from the catalyst by combustion. This combustion is supplied by a relatively low concentration of oxygen present in an oxygen-containing gas stream charged to the combustion zone through line 31. The gas streams supplied by line 31 enters annular gas transfer volume located outside of the outer screen 13 and is distributed over the outer surface of screen 13. The gas stream from conduit 31 then passes inward thorugh the catalyst bed 15 and emerges through the porous inner screen 14 into the cylindrical gas transfer volume. This gas stream contains recycled inerts such as nitrogen and water vapor and combustion products such as water vapor and carbon dioxide. The combustion of the carbon heats the gas as it passes through the catalyst. The resultant relatively high temperature gas stream is removed from the cylindrical gas transfer volume through the conduit 17, which feeds the combustion gas stream into the conduit 26. A portion of the combustion gas stream is vented off from the process through line 28 as required to remove the net combustion products. The remaining portion of the combustion gas stream passes through line 27 and is pressurized in the fan or compressor means 29. The relatively hot combustion gas is thereby pressurized to overcome the pressure drops inherent in being recirculated through the regeneration zone.

A first portion of the thus pressurized and still relatively hot combustion gas stream is passed through line 30 at a rate controlled by valve means 34. This gas stream enters the regeneration zone through line 30 as a relatively high temperature heating stream also referred to herein as a temperature adjustment stream. This relatively high temperature gas stream passes through a small lower portion of the annular catalyst bed which functions as a heating zone and then reemerges into the cylindrical gas transfer volume located within the inner screen 14. The intermixture of this heating gas stream with the combustion gas stream supplied through line 31 to promote carbon burnoff is limited by the ring-shaped baffle 18 which extends into the annular gas transfer volume from the inner surface of the wall of the regeneration zone.

The remaining portion of the relatively hot and pressurized combustion gas stream of line 27 flows through line 31 and enters a cooling means 32, which preferably is an indirect heat exchange means which employs air as a cooling medium. The gas stream of line 31 will also normally flow through a heating means 33 shown as an indirect heat exchange means. The heating means 33 is not normally employed during the operation of the process but is provided for use during the start-up of the regeneration zone to heat the catalyst sufficiently to obtain self-supporting combustion conditions. The thus temperature adjusted gas is passed through line 31 and into the combustion zone of the regeneration zone to support the combustion of carbon present on catalyst which enters the regeneration zone. The oxygen required for this combustion was admixed into the gas within a cylindrical gas transfer volume located within the inner screen 14, with the oxygen being charged to a bottom portion of the regeneration zone and flowing upward through cylindrical catalyst bed and then into the bottom of the cylindrical gas transfer volume. It is preferred that all of the oxygen is added in this manner. However, some or all of the oxygen could be supplied by other methods such as by addition to line 31.

In the lower section of the regeneration zone the catalyst, after having been treated for the removal of carbon in the combustion zone and heated in a temperature adjustment (heating) zone, is passed into a chlorination zone wherein it is confined as a cylindrical catalyst bed 19 occupying the total available space within the cylindrical cross section of the portion of the catalyst regeneration zone at this point. Chlorination of the catalyst is effected by a chlorination gas stream charged to the regeneration zone through line 39 and distributed within the catalyst bed through a distribution means shown as 21, which may be perforated conduit or conduits extending into the cylindrical catalyst bed. The chlorination gas preferably also contains oxygen, with the gas rising from the distributor 21 and flowing upward into upper portions of the regeneration zone. As the catalyst passes downward from the chlorination zone, it enters a drying zone wherein the catalyst is retained as a cylindrical bed 20. Heated air from line 35 is passed into a lower portion of the drying zone through conduit 37 and distributor pipe 22. The drying air also passes upward countercurrent to the flow of very slowly descending catalyst. The oxygen present in the air from line 35 also eventually rises into the cylindrical gas transfer volume within the cylindrical inner screen 14 to join the combustion gas. A portion of the air from line 34 flows through line 36 and is admixed with chlorine or other chlorine-containing substance to provide the chlorination gas stream.

The thus low-carbon content, chlorinated and dried catalyst is withdrawn from the regeneration zone through line 23 and transferred into a lockhopper means 24. This transfer may be regulated by means such as positive seal valves located in lines 23 or line 40 through which catalyst is withdrawn from lockhopper 24. The lockhopper vessel 24 basically acts as a seal device to prevent the admixture of air from the regeneration zone with hydrogen and hydrocarbon vapors present within other portions of the hydrocarbon conversion process. Nitrogen or another inert gas is therefore supplied through line 25 and will preferably flow upward through conduit 23 into the regeneration zone to purge oxygen from the descending catalyst. The regenerated catalyst is then transferred through line 40 into the lift engaging vessel 41. A stream of hydrogen gas from line 42 is preferably passed into the vessel 41 for the dual purposes of reducing the metallic components of the regenerated catalyst and for fluidizing the regenerated catalyst for transfer upward through conduit 4 and return to the reaction zone. The reducing gas is preferably hydrogen although a light hydrocarbon such as methane could also be employed. Reduction can be performed on catalyst awaiting transfer in a lift engaging vessel such as shown in the drawing or in a separate vessel. The conditions required for reduction will depend on the catalyst being employed. Superatmospheric pressure at a temperature above 750° F. (399° C.) in the presence of a reductant such as hydrogen or methane is required. In some instances reforming catalysts will require a temperature of about 950° F. (510° C.) for 60 minutes or more. This depiction of one embodiment of the invention is not intended to exclude from the scope of the invention other variations not shown on the drawing. For instance, the catalyst beds within the regeneration vessel could have different configurations, such as all cylindrical or all annular, or the regeneration zone could comprise two or more separate vessels rather than the single vessel depicted.

One embodiment of the invention may be characterized as a process for regenerating solid catalyst used in the reaction zone of a moving bed hydrocarbon conversion process which comprises the steps of passing used catalyst which has been withdrawn from the reaction zone of a hydrocarbon conversion process into a unitary catalyst regeneration zone and downward through the regeneration zone as a compact bed; contacting the used catalyst with an oxygen-containing gas stream in a combustion zone located within the regeneration zone at conditions which result in the combustion of carbon present on the used catalyst and the production of a combustion gas stream, which is withdrawn from the regeneration zone, and low-carbon catalyst; passing the low-carbon catalyst downward into and through a heating zone located within the regeneration zone, and therein contacting the low carbon catalyst with a heating gas stream; passing the low-carbon catalyst downward into and through a chlorination zone located within the regeneration zone, and therein contacting the low carbon catalyst with a chlorination gas stream which comprises a chlorine-containing substance; withdrawing low carbon catalyst from the regeneration zone; pressurizing at least a major portion of the combustion gas stream and producing thereby a relatively high pressure first process gas stream; passing a first aliquot portion of the first process stream into the heating zone as the previously referred to heating gas stream; and cooling a second aliquot portion of the first process stream by indirect heat exchange, and then passing the second portion of the first process stream into the combustion zone as the previously referred to oxygen-containing gas stream.

As previously mentioned, the subject method may be applied to a wide variety of processes including dehydrocyclodimerization or dehydrogenation of paraffinic hydrocarbons. The feed hydrocarbons for a dehydrogenation process employing a moving bed reactor would normally be one or more $C_2$ to $C_6$ straight chain or branched paraffinic hydrocarbons. Although it is possible to operate a dehydrogenation zone for the conversion of a mixture of two or more of such light hydrocarbons, it is preferred that the feed stream to the dehydrogenation zone is predominantly composed of a hydrocarbon(s) of a single carbon number. Catalysts and operating conditions for dehydrogenation zones may be readily found in the available literature. A preferred dehydrogenation catalyst comprises spherical particles of alumina which supports active catalytic components. The active catalytic components preferably include platinum, a halogen such as chlorine, potassium and tin. Further information on a light paraffin dehydrogenation catalyst may be obtained by reference to U.S. Pat. No. 4,469,811. The effluent stream of a dehydrogenation reaction zone may be treated in the same manner as the effluent stream of the reforming zone to provide by partial condensation a hydrogen-rich vapor phase and a liquid phase condensate stream which is sent to fractionation or other product recovery facilities.

When the subject process is employed for the dehydrocyclodimerization of hydrocarbons, the preferred feed stock is a $C_3$ to $C_5$ straight chain paraffinic hydrocarbon. The feed stream to the dehydrocyclodimerization process may however contain significant amounts of olefins of the same carbon number. This results in the process producing an aromatic-rich product which may contain a significant amount of branch chained $C_6$ to $C_9$ hydrocarbons depending on the feed composition. Again, the product of the dehydrocyclodimerization process may be recovered in a manner similar to that employed in a reforming process, with the reaction zone effluent stream being subjected to a cooling and partial condensation to produce a vapor phase hydrogen-rich stream and a condensation stream comprised of the product and feed hydrocarbons. The liquid phase condensate would normally be transported to fractionation facilities for the separation of the remaining lighter feed hydrocarbons, which may be recycled to the reaction zone, from the heavier product hydrocarbons. Further details on this process are available from U.S. Pat. Nos. 3,756,922; 4,291,182; 4,157,356 and 4,354,049.

As also previously mentioned, the subject methods as preferably employed in conjunction with a process for the catalytic refroming of a naphtha boiling range hydrocarbon mixture. Such a naphtha mixture is typically recovered from a crude oil but could be derived from shale oil, tar sands, or from the liquefaction of coal or other hydrocarbonaceous materials. Reforming is a vapor phase operation performed with a catalyst bed temperature in the range of about 750° F. to about 1050° F. It is normally not desired that the catalyst temperature exceeds about 1020° F. The other reforming conditions generally include a pressure of from about 20 psi to about 1000 psig, with pressures under about 150 psig being preferred, a liquid hourly spaced velocity of about 0.2 to 10.0 and a hydrogen to hydrocarbon mole ratio in the range of about 0.5:1.0 to about 10.0:1.0. The liquid hourly space velocity is the volumes of fresh charge stock contacted per hour divided by the volume of total catalyst particles. A preferred range for liquid hourly space velocities is from about 3.0 to about 8.0. The inlet temperature to the catalyst beds are normally maintained above about 950° F. Reforming catalyst typically contain one or more Group VIII noble metals (platinum, iridium, rhodium, and palladium) and a halogen such as chlorine and/or fluorine. These components of a catalyst are supported on a porous refractory carrier material such as alumina. The reforming catalyst may also contain one or more additional metallic catalytic components such as rhenium, germanium, or tin with the presence of tin presently being preferred in the catalyst. Further details on catalyst suitable for catalytic reforming may be obtained by reference to U.S. Pat. Nos. 3,740,328; 3,745,112; 3,948,804; and 4,367,137. The preferred physical form of the catalyst for use in a moving bed reaction and regeneration train is in the form of hard spherical particles having a diameter of from about 1/64 to about 5/32 of an inch.

The vapor phase effluent stream of the reforming reaction zone is preferably handled in a manner similar to that previously described. That is, the vapor phase effluent stream is subjected to heat exchange to recover useful heat and is then further cooled to effect a partial condensation and the production of the mixed phase effluent stream which is charged into a vapor-liquid separation vessel. The separation vessel would normally be operated at a pressure slightly reduced from the pressure maintained within the reaction zone. The separation vessel may therefore be operated at a pressure of from about 10 to about 950 psig with pressures under about 145 psig being preferred. The separation vessel would normally be operated at a temperature of from about 85 to about 155° F. The liquid phase condensate removed from the bottom of the separation vessel is preferably subjected to a recontacting step in which it is pressurized and combined with the compressed vapor phase material removed from the top of the separation vessel for the purposes of increasing the purity of the recovered hydrogen and increasing the liquid hydrocarbon yield. After this recontacting step, the liquid and vapor phase are once again separated with the liquid phase at this time being transported to fractionation facilities. Typically, the primary stage of the fractionation facilities consists of a debutanizer column. Suitable product recovery techniques are described in the prior art including U.S. Pat. Nos. 3,882,014 and 4,364,820. Dehydrogenation and dehydrocyclodimerization processes employ similar recovery schemes except they do not employ the recontacting step.

I claim as my invention:

1. A process for regenerating particulate catalyst which comprises the steps of:
   (a) passing used catalyst into a regeneration zone and downward through the regeneration zone as a compact bed;
   (b) contacting the used catalyst with an oxygen-containing gas stream in a combustion zone located within the regeneration zone at conditions which result in the combustion of carbon present on the used catalyst and thereby producing a combustion gas stream, which is withdrawn from the regeneration zone, and low-carbon catalyst;
   (c) passing the low-carbon catalyst downward through a temperature adjustment zone located within the regeneration zone and therein contacting the low-carbon catalyst with a temperature adjusting gas stream;
   (d) passing the low-carbon catalyst downward through a drying zone located within the regeneration zone and therein contacting the low carbon catalyst with a drying gas stream;
   (e) compressing at least a major portion of the combustion gas stream, and thereby producing a first process gas stream;
   (f) passing a first aliquot portion of the first process gas stream into the temperature adjustment zone as the previously referred to temperature adjusting gas stream; and,
   (g) cooling a second aliquot portion of the first process gas stream and then passing the second aliquot portion of the first process stream into the combustion zone as the previously referred to oxygen-containing gas stream.

2. The process of claim 1 further characterized in that the drying gas stream comprises oxygen and is passed upward within the regeneration zone into the combustion zone thereby supplying oxygen consumed within the combustion zone.

3. The process of claim 1 further characterized in that a chlorination zone is located between the temperature adjustment zone and the drying zone, and in that a chlorination gas stream which comprises a chlorine containing substance is passed into the chlorination zone.

4. The process of claim 3 further characterized in that the chlorination gas strem also comprises oxygen.

5. The process of claim 4 further characterized in that the chlorination gas stream is passed upward through low-carbon catalyst into the combustion zone, with oxygen present in the chlorination gas stream being consumed in the combustion zone during the burning of carbon.

6. The process of claim 5 further characterized in that the drying gas stream comprises oxygen and is passed upward within the regeneration zone into the combustion zone thereby supplying oxygen consumed within the combustion zone.

7. A process for regenerating solid catalyst used in the reaction zone of a moving bed hydrocarbon conversion process which comprises the steps of:
   (a) passing used catalyst which has been withdrawn from the reaction zone of a hydrocarbon conversion process into a unitary catalyst regeneration zone and downward through the regeneration zone as a compact bed;
   (b) contacting the used catalyst with an oxygen-containing gas stream in a combustion zone at conditions which result in the combustion of carbon present on the used catalyst and the production of a combustion gas stream, which is withdrawn from the regeneration zone, and low-carbon catalyst;
   (c) passing the low-carbon catalyst downward into and through a heating zone located within the regeneration zone, and therein contacting the low carbon catalyst with a heating gas stream;
   (d) passing the low-carbon downward into and through a chlorination zone located within the regeneration zone, and therein contacting the low carbon catalyst with a chlorination gas stream which comprises a chlorine-containing substance;
   (e) withdrawing low carbon catalyst from the regeneration zone;

(f) pressurizing at least a major portion of the combustion gas stream and producing thereby a relatively high pressure first process gas stream;

(g) passing a first aliquot portion of the first process stream into the heating zone as the previously referred to heating gas stream; and, (h) cooling a second aliquot portion of the first process stream by indirect heat exchange, and then passing the second portion of the first process stream into the combustion zone as the previously referred to oxygen-containing gas stream.

8. The process of claim 7 further characterized in that the chlorination gas stream also comprises oxygen, and in that oxygen present in the chlorination gas stream passes upward and is employed in the combustion zone in the combustion of carbon.

9. The process of claim 8 further characterized in that after the heating gas stream contacts the low carbon catalyst the heating gas stream becomes a portion of the combustion gas stream.

10. The process of claim 9 further characterized in that while within the regeneration zone the low carbon catalyst is contacted with an oxygen-containing drying gas stream in a drying zone after having been contacted with the chlorination gas stream and prior to being withdrawn from the regeneration zone.

11. The process of claim 10 further characterized in that oxygen present in the drying gas stream ascends upward through the chlorination zone and becomes admixed into the combustion gas stream withdrawn from the regeneration zone.

12. The process of claim 10 further characterized in that the catalyst is confined as an annular bed within the combustion zone and as a cylindrical bed within the drying zone.

13. The process of claim 12 further characterized in that the catalyst is confined as an annular catalyst bed during passage through the heating zone and is then passed into a cylindrical catalyst bed, which is employed in the chlorination zone.

14. The process of claim 13 further characterized in that countercurrent gas-catalyst flow occurs through the chlorination and drying zones.

15. The process of claim 7 further characterized in that catalyst withdrawn from the regeneration zone is contacted with a reducing gas in a reducing zone prior to being passed into the reaction zone.

16. The process of claim 10 further characterized in that catalyst withdrawn from the regeneration zone is contacted with a reducing gas in a reducing zone prior to being passed into the reaction zone.

17. The process of claim 16 further characterized in that the reducing gas comprises hydrogen.

* * * * *